US010393556B2

(12) United States Patent
Kim

(10) Patent No.: US 10,393,556 B2
(45) Date of Patent: Aug. 27, 2019

(54) ELECTRIC OIL PUMP CONTROL METHOD FOR OPERATING TRANSMISSION OF HYBRID VEHICLE

(71) Applicant: Hyundai Motor Company, Seoul (KR)

(72) Inventor: Yoh Han Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 535 days.

(21) Appl. No.: 15/252,640

(22) Filed: Aug. 31, 2016

(65) Prior Publication Data

US 2017/0285062 A1 Oct. 5, 2017

(30) Foreign Application Priority Data

Mar. 29, 2016 (KR) .................. 10-2016-0037420

(51) Int. Cl.
| G01F 1/00 | (2006.01) |
| F16H 57/04 | (2010.01) |
| F16H 61/00 | (2006.01) |
| B60K 6/44 | (2007.10) |

(52) U.S. Cl.
CPC ............ *G01F 1/00* (2013.01); *B60K 6/44* (2013.01); *F16H 57/0412* (2013.01); *F16H 57/0435* (2013.01); *F16H 57/0446* (2013.01); *F16H 57/0476* (2013.01); *F16H 61/0031* (2013.01); *F16H 2061/0037* (2013.01)

(58) Field of Classification Search
None
See application file for complete search history.

(56) References Cited

U.S. PATENT DOCUMENTS

| 6,692,402 | B2* | 2/2004 | Nakamori | ............. B60K 6/485 |
| | | | | 477/3 |
| 8,649,925 | B2* | 2/2014 | Light | .................... B60K 6/445 |
| | | | | 701/22 |
| 2014/0097043 | A1* | 4/2014 | Hoshinoya | .......... F16H 57/0405 |
| | | | | 184/6.4 |

(Continued)

FOREIGN PATENT DOCUMENTS

| JP | 2002-206630 A | 7/2002 |
| JP | 2010-174941 A | 8/2010 |

(Continued)

*Primary Examiner* — John C Kuan
(74) *Attorney, Agent, or Firm* — Mintz Levin Cohn Ferris Glovsky and Popeo, P.C.; Peter F. Corless

(57) ABSTRACT

An electric oil pump control method for operating a transmission of a hybrid vehicle which is driven by a first motor, a second motor, and an engine is provided. The method includes determining a number of revolutions of a low-pressure pump of an electric oil pump based on lubrication flow amount of the first motor, lubrication flow amount of the second motor, cooling flow amount of the first motor, and cooling flow amount of the second motor and determining a number of revolutions of a high-pressure pump of the electric oil pump based on control flow amount of a clutch of the transmission and lubrication flow amount of a rotation driver included in the transmission. A maximum value is determined of the determined number of revolutions of the low-pressure pump and the determined number of revolutions of the high-pressure pump as a number of revolutions of the electric oil pump.

10 Claims, 4 Drawing Sheets

(56) References Cited

U.S. PATENT DOCUMENTS

| | | | | |
|---|---|---|---|---|
| 2014/0334955 A1* | 11/2014 | Kim | ................ | F04B 39/02 |
| | | | | 417/447 |
| 2015/0025739 A1* | 1/2015 | Wakairo | ............ | F16H 61/0025 |
| | | | | 701/36 |
| 2017/0307065 A1* | 10/2017 | Buchmann | .......... | F16H 61/0031 |

FOREIGN PATENT DOCUMENTS

| | | | |
|---|---|---|---|
| KR | 10-2012-0063258 A | 6/2001 | |
| KR | 10-2016-0007860 A | 1/2016 | |

\* cited by examiner

ELECTRIC OIL PUMP CONTROL METHOD FOR OPERATING TRANSMISSION OF HYBRID VEHICLE

CROSS-REFERENCE TO RELATED APPLICATION

This application claims priority to and the benefit of Korean Patent Application No. 10-2016-0037420 filed in the Korean intellectual Property Office on Mar. 29, 2016, the entire contents of which are incorporated herein by reference.

BACKGROUND

(a) Field of the Invention

The present invention relates to a transmission of a vehicle, and more particularly, to an electric oil pump control method for operating a transmission of a hybrid vehicle.

(b) Description of the Related Art

A gasoline vehicle uses a mechanical oil pump (MOP) that operates by being connected to an engine. A hybrid vehicle uses an electric oil pump (EOP) to execute an electric vehicle driving mode. The MOP is directly connected to an engine of the hybrid vehicle to be rotated to allow the MOP to suction working oil stored in an oil pan to discharge the suctioned oil to a transmission. The discharged oil operates the transmission. The EOP is capable of being driven by a motor using a high voltage battery to operate a transmission.

Further, the hybrid vehicle includes an oil pump unit that includes the EOP configured to supply working oil to drive the transmission, a pump controller configured to operate the EOP, and a relay that connects or disconnects a power supply to the EOP. The pump controller is configured to transmit and receive information between a transmission control unit (TCU) via controller area network (CAN) communication and electronically operate the EOP based on a control signal applied from the TCU. The TCU is a superordinate controller.

The above information disclosed in this section is merely for enhancement of understanding of the background of the invention and therefore it may contain information that does not form the prior art that is already known in this country to a person of ordinary skill in the art.

SUMMARY

The present invention provides a control method (or a drive logic) of an electric oil pump that includes a single motor and two pumps. The control method is capable of executing, operation and lubrication of a clutch included in a transmission that is driven by two motors and an engine and of executing lubrication and cooling of the two motors included in the transmission of a hybrid vehicle such as a hybrid electric vehicle.

An exemplary embodiment of the present invention provides the electric oil pump control method for operating, the transmission of the hybrid vehicle which is driven by a first motor, a second motor, and an engine. The method may include determining, by a controller, number of revolutions of a low-pressure pump mounted within an electric oil pump based on lubrication flow amount of the first motor, lubrication flow amount of the second motor, cooling flow amount of the first motor, and cooling flow amount of the second motor; determining, by the controller, number of revolutions of a high-pressure pump mounted within the electric oil pump based on control flow amount of a clutch mounted within the transmission and lubrication flow amount of a rotation driver mounted within the transmission; and determining, by the controller, a maximum value of the determined number of revolutions of the low-pressure pump and the determined number of revolutions of the high-pressure pump as number of revolutions of the electric oil pump.

The determination of the number of revolutions of the low-pressure pump may include determining, by the controller, number of revolutions of the low-pressure pump by summing the lubrication flow amount of the first motor, the lubrication flow amount of the second motor, the cooling flow amount of the first motor, and the cooling flow amount of the second motor. The lubrication flow amount of the first motor may be determined by a flow amount calculation map based on power of the first motor and temperature of a fluid supplied for lubrication of the first motor. Additionally, the lubrication flow amount of the second motor may be determined by a flow amount calculation map based on power of the second motor and temperature of a fluid supplied for lubrication of the second motor. The cooling flow amounts of the first motor and the second motor may be determined by a flow amount calculation map based on temperatures of the first motor and the second motor and temperature of a fluid supplied for cooling of the first motor and the second motor.

The determination of the number of revolutions of the high-pressure pump may include determining, by the controller, number of revolutions of the high-pressure pump by summing the control flow amount of the clutch and the lubrication flow amount of the rotation driver. The control flow amount of the clutch may be determined by a flow amount calculation map based on pressure of the clutch and temperature of a fluid supplied for driving of the clutch. The lubrication flow amount of the rotation driver may be determined by a flow amount calculation map based on power of the engine and temperature of a fluid supplied for driving of the transmission.

The electric oil pump control method for operating the transmission of the hybrid vehicle may further include: before the number of revolutions of the low-pressure pump is determined, determining, by the controller, whether the first motor and the second motor operate as a motor drive mode; and before the number of revolutions of the high-pressure pump is determined, determining, by the controller, whether the engine operates as a engine drive mode. Additionally, the method may include the drive logic (a control logic) for the electric oil pump (EOP) configured to operate the clutch of the transmission, execute lubrication of a gear included in the transmission, and execute the lubrication and cooling of the two motors, thereby setting an operation mode of the electric oil pump.

The exemplary embodiment of the present invention may determine an optimal operation mode of the EOP that provides a flow amount required for the lubrication and cooling of the motors, the operation of the clutch, and the lubrication of the gear to optimize fuel efficiency. The exemplary embodiment of the present invention may determine an optimal flow amount of the EOP by setting power of the motor and power of the engine as an input variable and by comparing a maximum value of the motor power with a maximum value of the engine power, thereby ensuring a flow amount of the pump. Further, the exemplary embodiment of the present invention may monitor a number of revolutions and torque of the motor and a number of revolutions and torque of the engine based on a driving condition to detect a factor affecting durability of the transmission.

BRIEF DESCRIPTION OF THE DRAWINGS

A brief description of the drawings will be provided to more sufficiently understand the drawings which are used in the detailed description of the present invention.

DETAILED DESCRIPTION

Figure 1:
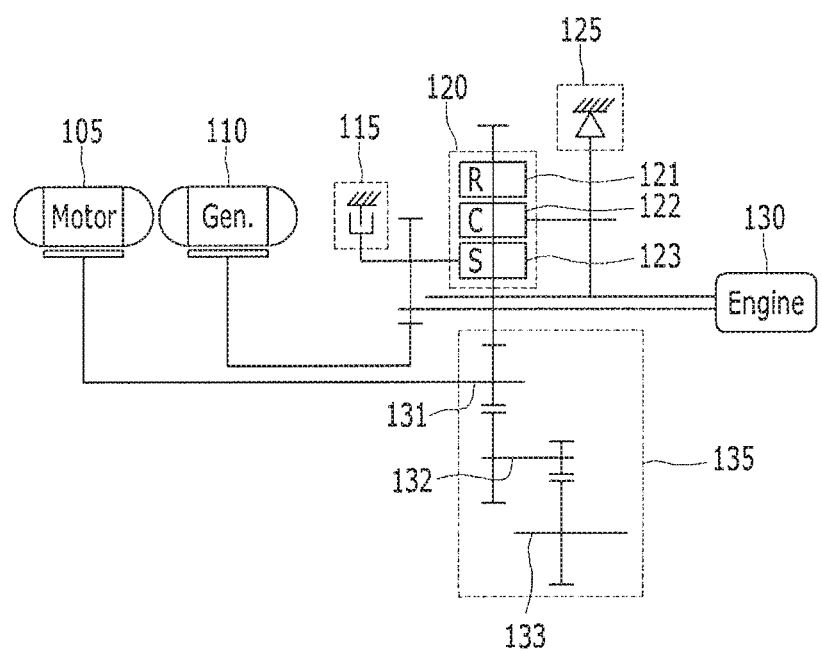
FIG. 1 is a view illustrating a transmission including two motors according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In order to sufficiently understand the present invention and the object achieved by embodying the present invention, the accompanying drawings illustrating exemplary embodiments of the present invention and contents described in the accompanying drawings are to be referenced.

Hereinafter, the present invention will be described in detail by describing exemplary embodiments of the present invention with reference to the accompanying drawings. In describing the present invention, well-known configurations or functions will not be described in detail since they may unnecessarily obscure the gist of the present invention. Throughout the accompanying drawings, the same reference numerals will be used to denote the same components.

Terms used in the present specification are only used in order to describe specific exemplary embodiments rather than limiting the present invention. Singular forms are to include plural forms unless the context clearly indicates otherwise. It will be further understood that the terms "include" or "have" used in the present specification specify the presence of features, numerals, steps, operations, components, or pans mentioned in the present specification, or a combination thereof, but do not preclude the presence or addition of one or more other features, numerals, steps, operations, components, parts, or a combination thereof. Throughout this specification and the claims that follow, when it is described that an element is "coupled" to another element, the element may be "directly coupled" to the other element or "electrically or mechanically coupled" to the other element through a third element.

Unless defined otherwise, it is to be understood that the terms used in the present specification including technical and scientific terms have the same meanings as those that are generally understood by those skilled in the art. It must be understood that the terms defined by the dictionary are identical with the meanings within the context of the related art, and they should not be ideally or excessively formally defined unless the context clearly dictates otherwise.

FIG. 1 is a view illustrating a transmission including two motors according to an exemplary embodiment of the present invention. Referring to FIG. 1, the transmission including two motors may be referred to as a flexible hybrid system (FHS) type transmission, may be driven by two motors 105 and 110 and an engine 130, and may perform function of a continuously variable transmission (CVT).

The transmission may include a planetary gear set (or a planetary gear device) 120. A ring gear 121 of the planetary gear set 120 may be connected to a first countershaft 131 of a power output unit 135 including an output shaft (or a main shaft) 133. The output shaft 133 may be configured to deliver power to wheels (or driving wheels). The first countershaft 131 may be connected to a second countershaft 132 via a gear. The second countershaft 132 may be connected to the output shaft 133 via a gear. A carrier 122 of the planetary gear set 120 may be connected to a one way clutch (OWC) 125 and the engine 130 such as an internal combustion engine. A sun gear 123 of the planetary gear set 120 may be connected to an overdrive brake (OD/B) 115. The OD/B 115 may also be referred to as an overdrive (OD) clutch, an OD brake clutch, or an OD clutch brake. The one way clutch (OWC) 125 and the OD/B 115 may be connected to a housing of the transmission.

Further, a first motor (or a first drive motor) 105 may be connected to the first countershaft 131 of the power output unit 135. A second motor (or a second drive motor) 110 and the engine 130 may be connected to the sun gear 123 via a gear. The second motor 110 may also be operated as a generator for charging a high voltage battery of a hybrid vehicle including the FHS transmission. The high voltage battery may be configured to supply power (electric power) to the first motor 105 and the second motor 110.

Figure 2:
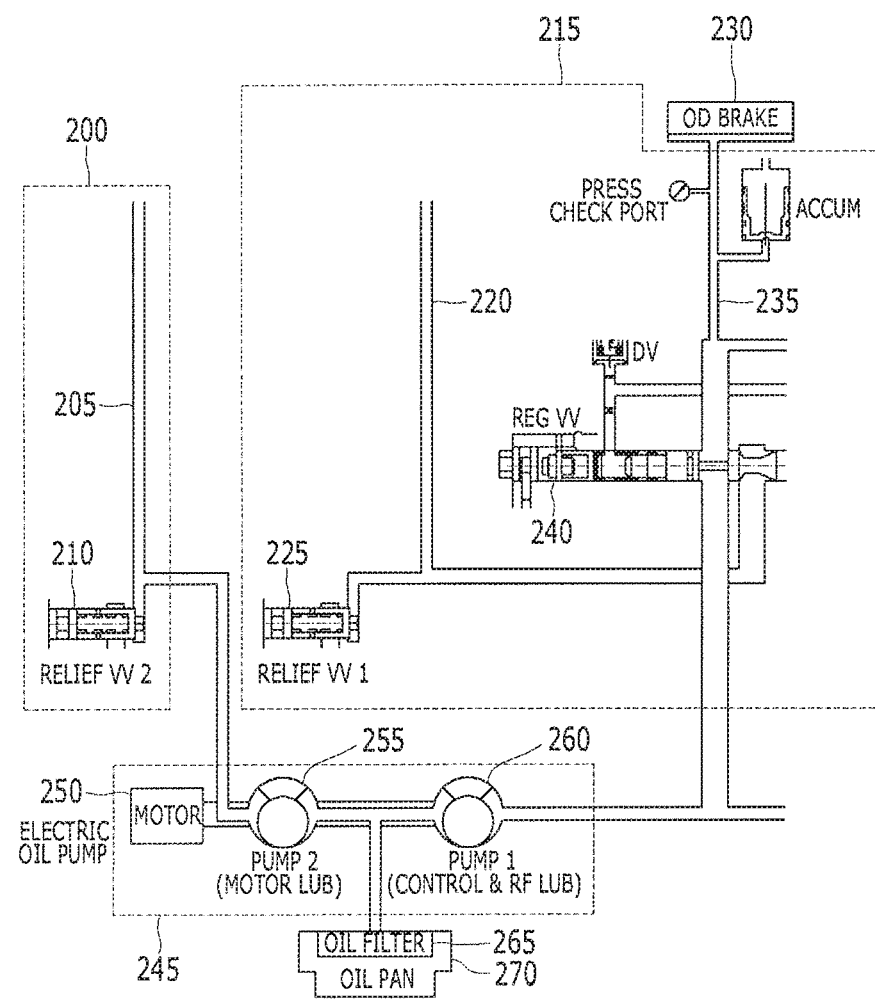
FIG. 2 is a view illustrating an exemplary embodiment of a hydraulic circuit including an electric oil pump (EOP) that operates a flexible hybrid system (FHS) transmission illustrated in FIG. 1 according to an exemplary embodiment of the present invention.

FIG. 2 is a view illustrating an exemplary embodiment of a hydraulic circuit including the electric oil pump that operates the FHS transmission illustrated in FIG. 1. The various components and method described herein below may be executed by a controller having a processor and a memory. Referring to FIG. 2, the hydraulic circuit may include the electric oil pump (EOP) 245, a low-pressure unit 200, a high-pressure unit 215, and an oil pan 270 including an oil filter 265.

The EOP (245) may include an electric motor 250, a low-pressure pump 255 configured to supply a fluid (e.g., oil) to the low-pressure unit 200 and may be driven by the electric motor 250, and a high-pressure pump 260 configured to supply a fluid (e.g., oil) to the high-pressure unit 215 and may be driven by the electric motor 250. The oil pan 270 may be configured to supply the fluid to the low-pressure pump 255 and the high-pressure pump 260 through the oil filter 265. The hydraulic circuit may use the EOP 245 to separately perform a control operation of the clutch 115, a lubrication operation of a gear included in the transmission, and cooling and lubrication operations of motors 105 and 110.

The low-pressure unit 200 may include a lubricating oil line 205 that provides a lubricant to the first motor 105 and second motor 110 and a relief valve 210. The low-pressure unit 200 may be configured to perform cooling and lubrication functions of the first motor 105 and second motor 110. The high-pressure unit 215 may include a clutch control flow path 235 that provides a fluid (e.g., oil) for operating the clutch 115, a lubricant flow path 220 that provides a lubricant to a gear of the transmission and a bearing which supports a gear shaft (a shaft connected to the gear), a regulating valve 240, and a relief valve 225. The high-pressure unit 215 may be configured to perform a control operation of the clutch 115 and a lubrication operation of the gear and the bearing.

Figure 3:
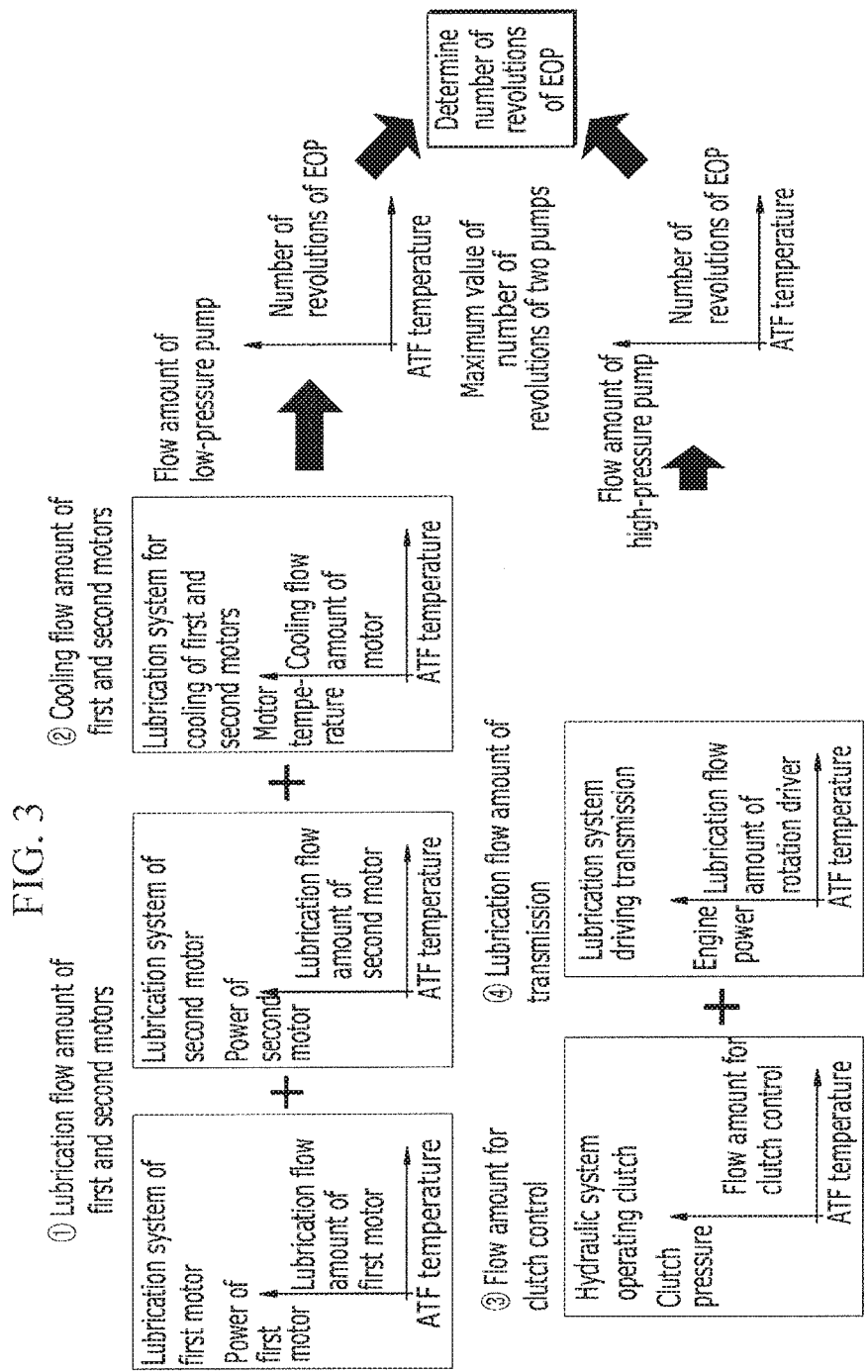
FIG. 3 is a view describing a driving method of the EOP shown in FIG. 2 according to an exemplary embodiment of the present invention.

FIG. 3 is a view describing a driving method of the EOP shown in FIG. 2. Referring to FIG. 3, a lubrication flow amount of the first motor 105 required in a lubrication system of the motor may be determined (calculated) by a flow amount calculation map (or a flow amount calculation map table) based on power of the first motor 105 and temperature of a fluid (e.g., an automatic transmission fluid (ATF)). The first motor 105 may be configured to generate heat in proportion to a number of revolutions and torque of the first motor 105, and thus the power of the first motor 105 may be set as a main determinant (or a calibration factor) in the flow amount calculation map. The power of the first motor 105 may be a product of the number of revolutions of the first motor and torque of the first motor. The flow amount calculation map may be determined by a test and may be stored in a memory of the controller.

A lubrication flow amount by which the second motor 110 is driven may be determined by a flow amount calculation map based on power of the second motor and temperature of a fluid (e.g., an automatic transmission fluid (ATF)). The second motor 110 may be configured to generate heat in proportion to a number of revolutions and torque of the second motor 110, and thus the power of the second motor 110 may be set as a main determinant (or a calibration factor) in the flow amount calculation map. The power of the second motor 110 may be a product of number of revolutions of the second motor and torque of the second motor. The flow amount calculation map may be determined by a test and may be stored in a memory of the controller.

The lubrication flow amount of the first motor 105 and the lubrication flow amount of the second motor 110 may cool heat generated when the first motor 105 and the second motor 110 may be driven and may be required for lubrication of the first motor and the second motor when the motors are driven. The lubrication flow amount of the first motor 105 and the lubrication flow amount of the second motor 110 may be discharged by the low-pressure pump 255 that is a single source, and thus a value obtained by summing lubrication flow amounts of the first motor and the second motor may be determined as a final lubrication flow amount of the low-pressure unit 200.

Additionally, cooling flow amounts of the first motor 105 and the second motor 110 may be determined by a flow amount calculation map based on a correlation between temperatures of the first motor and the second motor and temperature of a fluid (e.g., an automatic transmission fluid (ATF)) supplied for cooling of the first motor and the second motor. The flow amount calculation map may be determined by a test. The cooling flow amounts of the first motor 105 and the second motor 110 may be cooling assistance flow amounts for a fail safety (or a fail-safe control) of the lubrication flow amounts of the first motor and the second motor.

The lubrication flow amounts of the first motor 105 and the second motor 110 may have a cooling function, and the cooling flow amounts of the first motor 105 and the second motor 110 may be necessary when temperature of the ATF increases substantially due to abnormal heat generation of the motor. The temperature of the motor in the flow amount calculation map may be a maximum value of temperatures of the first motor 105 and the second motor 110 sensed (or measured) by a sensor. A flow amount of the low-pressure pump 255 may be determined (calculated) by summing the lubrication flow amounts of the first motor and the second motor and the cooling flow amounts of the first motor and the second motor.

A first number of revolutions of the EOP 245 (or the tow-pressure pump 255) may be determined (calculated) by an EOP number of revolutions calculation map based on the flow amount of the low-pressure pump and temperature of a fluid (e.g., an automatic transmission fluid (ATF)). For example, the number of revolutions may be revolutions per minute (RPM). The EOP number of revolutions calculation map may be determined by a test. A control flow amount of the clutch 115 may be determined (calculated) by a flow amount calculation map based on pressure of the clutch and temperature of a fluid (e.g., an automatic transmission fluid (ATF)) supplied for driving of the clutch. The flow amount calculation map may be a two-dimensional map configured based on a relationship between pressure of the clutch 115 and temperature of the ATF. The flow amount calculation map may be determined by a test. The control flow amount of the clutch 115, applied to the clutch, may be used at a high pressure (e.g., about 5 bar or greater), and thus the control flow amount may be discharged from the high-pressure pump 260.

The lubrication flow amount of the transmission may be determined by a flow amount calculation map based on power (or output) of the engine 130 and temperature of a fluid (e.g., an automatic transmission fluid (ATF)) supplied for driving of the transmission. The lubrication flow amount of the transmission, which is a lubrication flow amount for a rotation driver (e.g., the gear and the bearing) of the transmission used when the transmission is driven, may be discharged from the high-pressure pump 260. A value obtained by summing the lubrication flow amount of the transmission and the control flow amount of the clutch 115 may be determined as a final discharge flow amount of the high-pressure pump 260 (or the high-pressure unit 215). The flow amount calculation map may be determined by a test.

Lubrication of the rotation driver may be determined by a number of revolutions and torque of the engine 130 connected to an input shaft of the transmission, and thus power of the engine 130 may be a determinant (or a calibration factor) for lubrication of the rotation driver. The power of the engine 130 may be a product of the number of revolutions of the engine and torque of the engine. A second number of revolutions of the EOP 245 (or the high-pressure pump 260) may be determined (calculated) by an EOP number of revolutions calculation map based on the flow amount of the high-pressure pump and temperature of a fluid (e.g., an automatic transmission fluid (ATF)). For example, the number of revolutions may be revolutions per minute (RPM). The EOP number of revolutions calculation map may be determined by a test.

As described above, required flow amounts of the low-pressure pump 255 and the high-pressure pump 260 may be calculated. A final number of revolutions of the EOP 245 may be determined as a maximum value of the first number of revolutions and the second number of revolutions. Since the high-pressure pump 255 and the low-pressure pump 260 may be driven by the single electric motor 250, the number of revolutions of the EOP 245 may be determined as the maximum value of number of revolutions of the two pumps.

As described above, the exemplary embodiment of the present invention may be an optimal technique for operating the EOP configured to supply flow amounts required for operation of the OD/B 115 and cooling and lubrication of two motors 105 and 110. The OD/B 115 may be a transmission clutch mounted within the FHS transmission of a power split-parallel type hybrid vehicle. In particular, the exemplary embodiment of the present invention may be an optimal control technique for the EOP operating the FHS transmission that may be driven by two motors.

A power split operation mode of a hybrid electric vehicle (HEV) mode that is a driving mode of the hybrid vehicle may indicate a mode in which power of the engine 130 may be output via the power output unit 135 and the second motor 110 may operate as a generator using the power of the engine. In the power split operation mode, the overdrive brake 115 may be in an open state and the OWC 125 may be in an open state (or a free state). When the second motor 110 operates as the generator, the high voltage battery mounted within the hybrid vehicle may be charged.

A parallel mode of the HEV mode may indicate a mode in which power of the engine 130 and power of the first motor 105 may be output via the power output unit 135. In the parallel mode, the overdrive brake 115 may be in a closed state and the OWC 125 may be in an open state (or a free state). A first electric vehicle (EV) mode of the driving mode of the hybrid vehicle may indicate a mode in which only the power of the first motor 105 may be output via the power output unit 135. In the first electric vehicle (EV) mode, the overdrive brake 115 may be in an open state and the OWC 125 may be in an open state (or a free state). A second electric vehicle (EV) mode of the driving mode of the hybrid vehicle may indicate a mode in which power of the first motor 105 and power of the second motor 110 may be output via the power output unit 135. In the second electric vehicle (EV) mode, the overdrive brake 115 may be in an open state and the OWC 125 may be in a locked state.

Figure 4:
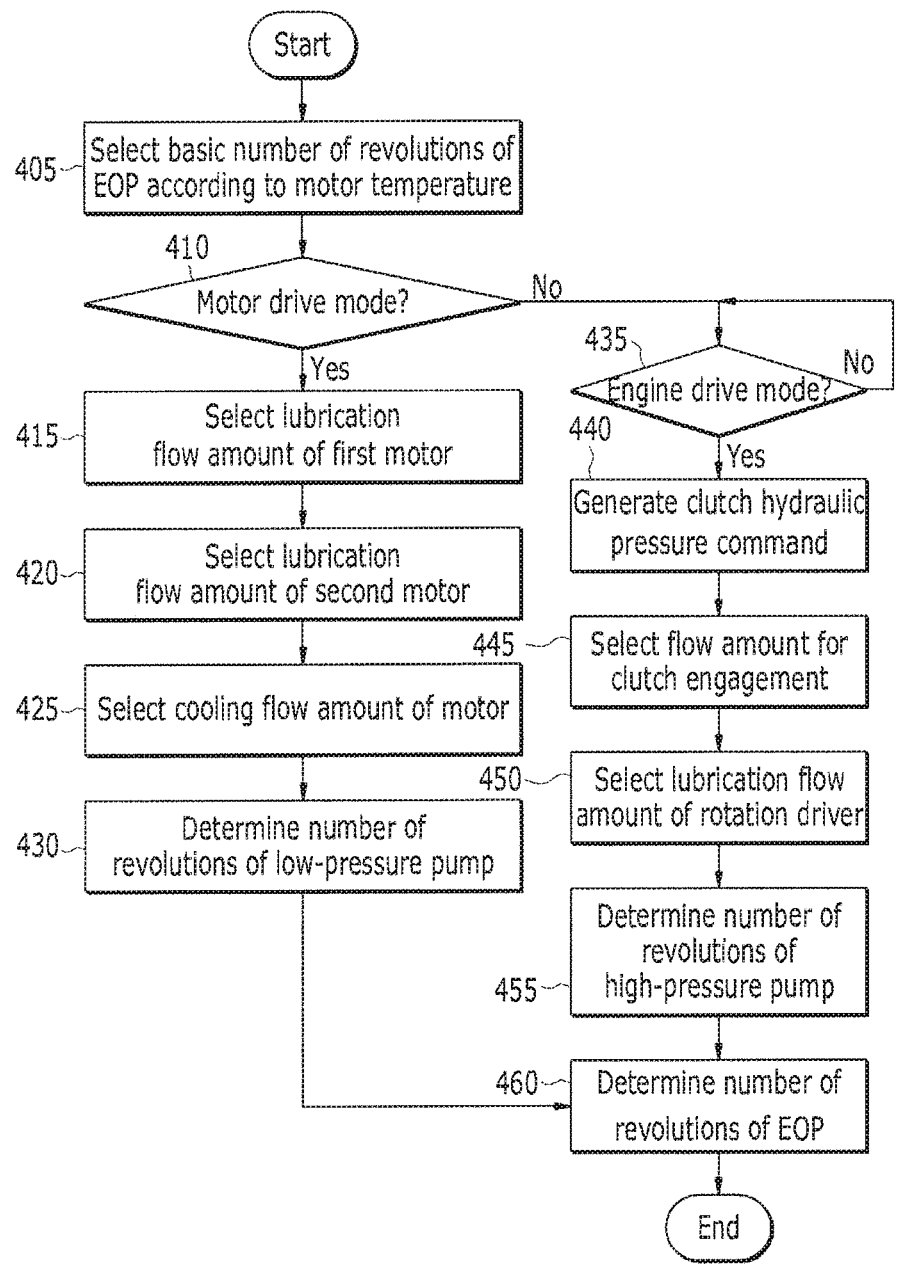
FIG. 4 is a flowchart describing an electric oil pump control method for operating a transmission of a hybrid vehicle according to an exemplary embodiment of the present invention.

FIG. 4 is a flowchart describing the electric oil pump control method for operating the transmission of the hybrid vehicle according to an exemplary embodiment of the present invention. The method may be executed by a vehicle controller. The transmission may be a device as shown in FIG. 1. Referring to FIGS. 1-4, in a selection step 405, a controller configured to operate the hydraulic circuit including the EOP 245 may be configured to select a basic number of revolutions of the EOP based on temperature of the motor 105 or 110 when the hybrid vehicle is driven (or traveled). For example, the controller may be one or more microprocessors operated by a program or hardware including the microprocessor. The program may include a series of commands for executing the electric oil pump control method for operating the transmission of the hybrid vehicle according to an exemplary embodiment of the present invention. The controller may be configured to execute an entire operation of the hybrid vehicle including operation of the transmission and the hydraulic circuit.

According to a determination step 410, the controller may be configured to determine whether the transmission (or the hybrid vehicle vehicle) is in a motor drive mode based on torque required by a driver. The motor drive, mode may be a mode in which the first motor and the second motor are driven. The driver's required torque may be detected by an acceleration pedal position sensor within the hybrid vehicle (e.g., an engagement degree may be detected by the sensor). In response to determining that the transmission is in the motor drive mode, the process of the electric oil pump control method for operating the transmission of the hybrid vehicle may proceed to a selection step 415. In response to determining that the transmission is not in the motor drive mode, the process may proceed to a determination step 435. According to the selection step 415, the controller may be configured to determine (or select) the lubrication flow amount of the first motor 105 using the flow amount calculation map based on power of the first motor and temperature of a fluid (e.g., oil or the ATF) supplied for lubrication of the first motor. The power of the first motor 105 may be a product of a number of revolutions of the first motor and torque of the first motor.

According to a selection step 420, the controller may be configured to determine (select) the lubrication flow amount of the second motor 110 using the flow amount calculation map based on power of the second motor and temperature of a fluid (e.g., oil or the ATF) supplied for lubrication of the second motor. The power of the second motor 110 may be a product of a number of revolutions of the second motor and torque of the second motor. According to a selection step 425, the controller may be configured to determine (select)

the cooling flow amounts of the first motor 105 and the second motor 110 using the flow amount calculation map based on temperatures of the first motor and the second motor and temperature of a fluid (e.g., oil or the ATF) supplied for cooling of the first motor and the second motor.

According to a determination step 430, the controller may be configured to determine a number of revolutions of the low-pressure pump included in the EOP 245 based on the lubrication flow amount of the first motor 105, the lubrication flow amount of the second motor 110, the cooling flow amount of the first motor, and the cooling flow amount of the second motor. According to the determination step 435, the controller may be configured to determine whether the transmission (or the hybrid vehicle vehicle) is in an engine drive mode based on torque required by the driver.

According to a command generating step 440, in response to determining that the transmission is in the engine drive mode, the controller may be configured to generate a clutch hydraulic pressure command to supply hydraulic pressure to the clutch 115. Hydraulic pressure of the clutch may indicate line pressure of a flow line (or a flow path) connected to the clutch 115. According to a selection step 445, after the clutch hydraulic pressure command is generated, the controller may be configured to determine (select) the control flow amount of the clutch 115 using the flow amount calculation map based on pressure of the clutch and temperature of a fluid (e.g., oil or the ATF) supplied for driving (e.g. engagement) of the clutch.

According to a selection step 450, the controller may be configured to determine (select) the lubrication flow amount of the rotation driver mounted within the transmission using the flow amount calculation map based on power of the engine 130 and temperature of a fluid (e.g., oil or the ATF) supplied for driving of the transmission. The power of the engine 130 may be a product of a number of revolutions of the engine and torque of the engine. According to a determination step 455, the controller may be configured to determine number of revolutions of the high-pressure pump included in the EOP 245 based on control flow amount of the clutch mounted within the transmission and lubrication flow amount of the rotation driver. According to a determination step 460, the controller may be configured to determine a maximum value of the determined number of revolutions of the low-pressure pump and the determined number of revolutions of the high-pressure pump as the number of revolutions of the EOP 245.

As set forth above, exemplary embodiments have been disclosed in the accompanying drawings and the specification. Herein, specific terms have been used, but are just used for the purpose of describing the present invention and are not used for qualifying the meaning or limiting the scope of the present invention, which is disclosed in the appended claims. Therefore, it will be understood by those skilled in the art that various modifications and equivalent exemplary embodiments are possible from the present invention. Accordingly, the actual technical protection scope of the present invention must be determined by the spirit of the appended claims.

DESCRIPTION OF SYMBOLS

105: first motor
110: second motor
115: overdrive brake
120: planetary gear set
125: one way clutch
130: engine
135: power output unit

What is claimed is:

1. An electric oil pump control method for operating a transmission of a hybrid vehicle which is driven by a first motor, a second motor, and an engine, comprising:
   determining, by a controller, a number of revolutions of a low-pressure pump mounted within an electric oil pump based on a lubrication flow amount of the first motor, a lubrication flow amount of the second motor, a cooling flow amount of the first motor, and a cooling flow amount of the second motor;
   determining, by the controller, a number of revolutions of a high-pressure pump mounted within the electric oil pump based on a control flow amount of a clutch mounted within the transmission and a lubrication flow amount of a rotation driver mounted within the transmission; and
   determining, by the controller, a maximum value of the determined number of revolutions of the low-pressure pump and the determined number of revolutions of the high-pressure pump as a number of revolutions of the electric oil pump.

2. The electric oil pump control method of claim 1, wherein the determining of the number of revolutions of the low-pressure pump includes:
   determining, by the controller, the number of revolutions of the low-pressure pump by summing the lubrication flow amount of the first motor, the lubrication flow amount of the second motor, the cooling flow amount of the first motor, and the cooling flow amount of the second motor.

3. The electric oil pump control method of claim 2, wherein the lubrication flow amount of the first motor is determined by a flow amount calculation map based on power of the first motor and a temperature of a fluid supplied for lubrication of the first motor.

4. The electric oil pump control method of claim 2, wherein the lubrication flow amount of the second motor is determined by a flow amount calculation map based on power of the second motor and a temperature of a fluid supplied for lubrication of the second motor.

5. The electric oil pump control method of claim 2, wherein the cooling flow amounts of the first motor and the second motor are determined by a flow amount calculation map based on temperatures of the first motor and the second motor and a temperature of a fluid supplied for cooling of the first motor and the second motor.

6. The electric oil pump control method of claim 1, wherein the determining of the number of revolutions of the high-pressure pump includes:
   determining, by the controller, the number of revolutions of the high-pressure pump by summing the control flow amount of the clutch and the lubrication flow amount of the rotation driver.

7. The electric oil pump control method of claim 6, wherein the control flow amount of the clutch is determined by a flow amount calculation map based on pressure of the clutch and a temperature of a fluid supplied for driving of the clutch.

8. The electric oil pump control method of claim 6, wherein the lubrication flow amount of the rotation driver is determined by a flow amount calculation map based on power of the engine and a temperature of a fluid supplied for driving of the transmission.

9. The electric oil pump control method of claim 1, further comprising:

determining, by the controller, whether the first motor and the second motor operate as a motor drive mode before determining the number of revolutions of the low-pressure pump.

10. The electric oil pump control method of claim 1, further comprising:
determining, by the controller, whether the engine operates as a engine drive mode before determining the number of revolutions of the high-pressure pump.

* * * * *